May 22, 1962
L. F. BLATT
3,035,831
TOGGLE CLAMP
Filed Nov. 29, 1960
2 Sheets-Sheet 1
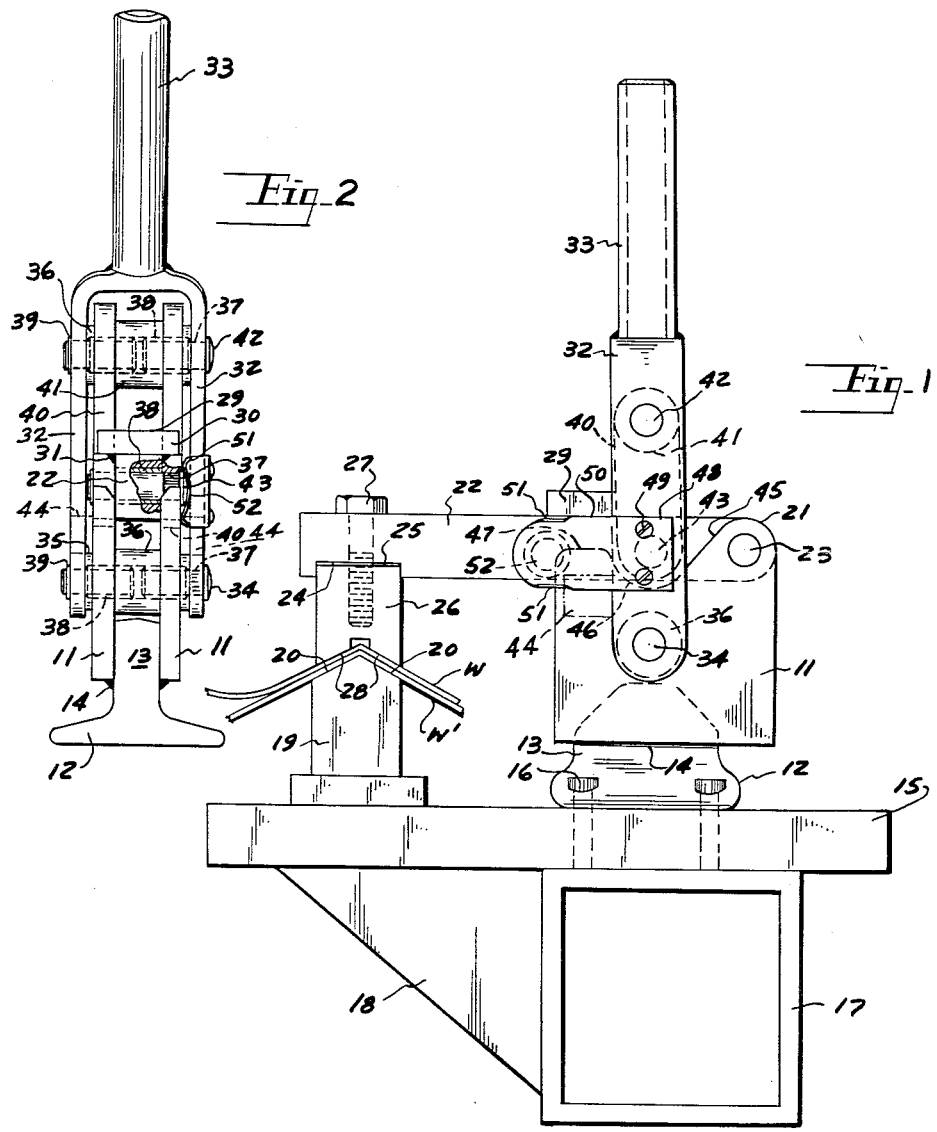
INVENTOR.
LELAND F. BLATT
BY
Robert A. Sloman
ATTORNEY May 22, 1962 L. F. BLATT 3,035,831
TOGGLE CLAMP Filed Nov. 29, 1960 2 Sheets-Sheet 2

INVENTOR.
LELAND F. BLATT
BY
Robert A. Slocum
ATTORNEY

United States Patent Office 3,035,831
Patented May 22, 1962

3,035,831
TOGGLE CLAMP
Leland F. Blatt, 24121 Mound Road, Warren, Mich.
Filed Nov. 29, 1960, Ser. No. 72,443
5 Claims. (Cl. 269—228)

The present invention relates to a toggle clamp and more particularly to an improved linkage fast action guided arm toggle clamp.

Various securing clamps have heretofore been devised for the purpose of immovably anchoring the workpiece or a pair of workpieces in registry for a tooling, machining or welding operation.

It is the object of the present invention to provide an improved toggle clamp assembly with a special form of linkage and means for guiding the holddown arm in work securing position.

It is a further object of the present invention to provide a retainer means in conjunction with the handle link of the toggle clamp for retaining the assembled parts when in release position against accidental closing.

These and other objects will be seen from the following specification and claims in conjunction with the appended drawings in which:

FIG. 1 is a side elevational view of the present guided arm toggle clamp.

FIG. 2 is an end elevational view thereof partly broken away and sectioned for illustration.

Figure 3:
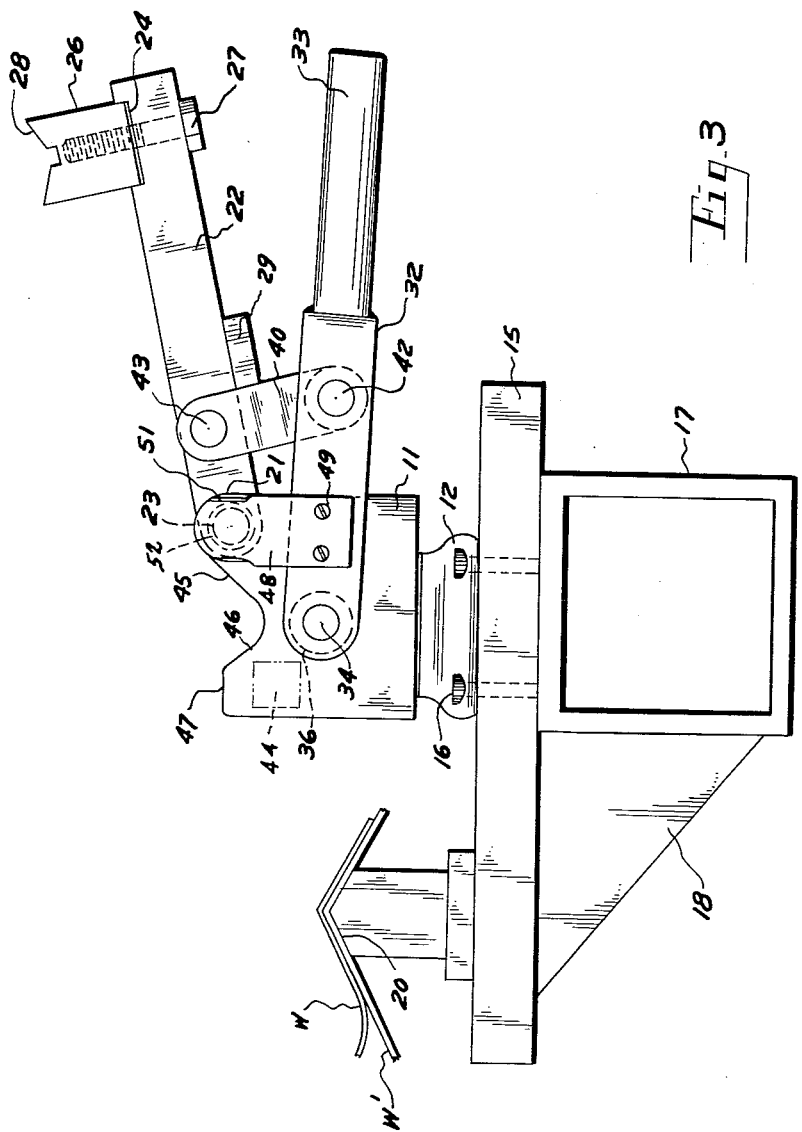

FIG. 3 corresponds to FIG. 1 showing the "release" position of the parts.

It will be understood that the above drawings illustrate merely a preferred embodiment of the invention and that other embodiments are contemplated within the scope of the claims hereinafter set forth.

Referring to the drawings, and particularly FIGS. 1 and 2, the present fast action guided arm toggle clamp includes a pair of upright parallel spaced base plates 11 having a mounting base 12.

In the preferred embodiment the base 12 has a central upright flange 13 which projects between the said base plates as shown in FIG. 2 and is fixedly secured thereto as by welds 14. In this connection, and as particularly noted in FIG. 1, said plates 11 may be inclined in any desired angle with respect to the flange 13 before the welding operation, as desired, for a particular job.

It is contemplated also that instead of the adjustable type of base 12—13 employed, an ordinary rectangular base could just as well be employed to supportably receive the lower horizontal edges of the base plates 11 and fixedly secured thereto as by welding.

In any event, the present illustrative base 12 is mounted upon the table 15 and forming a part of a fixture 17 by plurality of holddown fastening screws 16, which extend downwardly through the flange of the base and into the table 15. The table is reinforced towards its left end by the webbing 18 completing a rigid support for the anvil or work support 19 which is fixedly secured thereto and which includes for the particular job employed the upper but downwardly inclined faces 20, adapted to cooperatively receive the pair of work-pieces W and W'.

It is contemplated, of course, that the work receiving surface of the anvil or support 19 may be of any desired shape to fit a particular job and accordingly would be interchangeable.

In the illustrative embodiment of the invention, workpieces W or W' fragmentarily shown, are clamped together for a welding operation. For illustration, these parts might be a ¼ panel or deck of a vehicle to be welded to an adjacent part.

Each of the base plates 11 towards one end have the elevated supports 21 which receive therebetween one end of the work holddown arm 22, which is pivotally connected therewith as by the pivot pin 23 hereafter described in further detail.

Referring to FIG. 1, the holddown arm 22, extends between the upright guides 47 adjacent the opposite end of each of the plates 11, and laterally outward thereof, being undercut as at 24 to receive the shim 25 and the workpiece holddown finger 26 fixedly secured thereto by a suitable fastener 27. The under-surface of finger 26 is tapered and formed as at 28 to correspond to the shape of the surfaces 20 of anvil 19, or for that matter the shape of a particular workpiece to be retained thereby in cooperation with the anvil 19.

The rectangular stop plate 29, FIGS. 1 and 2 is arranged transversely of arm 22 with its free ends projecting laterally thereof as at 30, the said stop being fixedly secured to said arm by the welds 31, FIG. 2. There is provided as a part of the present invention a handle link 32, which is bifurcated or of inverted U-shape which overlies intermediate portions of the base plates 11, projecting thereabove.

The lower end of handle link is spaced outwardly of the outer walls of base plates 11, as shown in FIG. 2, and is pivotally mounted thereon by the pin 34 with spacers 35 interposed, as shown in FIG. 2. There is also provided an additional spacer 36 interposed between base plates 11, which spacer, as well as the plates 11, and the said spacers 35, are apertured so as to cooperatively and retainingly reeceive the bearings or bushings 38.

One end of the pin 34 adjacent its head is knurled as at 37 for frictional engagement with one side of the link 32 to prevent relative rotation of the said pin. The said pin then extends through respective spacers 35—36 and through the base plates 11 and at its opposite end upon the exterior of the link 32 is retained against endwise movement by the retainer ring 39.

This type of assembly is employed for each of the pivot pins in the assembly and which include pivot pins 23, 43, 34 and 52 hereafter referred to.

The manually operable link 32 has at one end the handle 33 for effecting pivotal movements thereof for opening and closing the present toggle clamp. A pair of upright parallel spaced spacer links 40 are arranged substantially coplanar with and above the base plates 11 directly above their respective concave clearance recesses 46, and with a suitable spacer 41 interposed between the said spacer links.

The pivot pin 42 extends through upper portions of the handle link 32, through corresponding spacers 36, through upper portions of the spacer links and through the said spacer 41, and upon the far side of the handle link secured thereto by the locking ring 39 in a conventional manner. Here also suitable bushings 38 are nested within portions of the said spacers 36 and 41, as well as the spacer links 40.

The respective lower ends of the spacer links 40 are positioned upon opposite sides of holddown arm 22 and pivotally connected therewith by the pin 43, similar to pin 42, as best shown in FIG. 2, also including the knurled portion 37, which anchors the said pin against rotation with respect to the links 40. Here also a suitable bushing 38 is nested within the bore in the holddown arm 22 to cooperatively receive the pin 43.

Referring to FIG. 1 of the drawing, it is noted that when the holddown arm 22 is in the locking or work retaining position shown that pivot pin 43 has passed dead center with respect to the pivots 34 and 42 to effectively lock the toggle clamp in holding position. In view of the linkage employed in the present toggle clamp, the stop 29 is provided, as best shown in FIGS. 1 and 2 which in the operative work retaining position shown retainingly engages the upright edges of the respective spacer links 40, FIG. 2. Thus the stop 29 actually limits the pivotal movements of the links 40 for the completion of the locking action of the toggle clamp to assure the locking action described.

It is noted, as above described, the base plates 11 at their one ends have the extensions 47 at their top edges to cooperatively and guidably receive the holddown arm 22 to thus define and provide for the present guided arm toggle clamp.

There is also provided upon the handle link 32 upon one side thereof the right angularly related retainer clamp 48, secured thereto at 49 and being inwardly and laterally offset as at 50, providing the retainer elements upon the free end thereof mounted on its top and bottom, being curved lips 51 and the arcuate recess 52.

The retainer plate 48 serves no purpose in the work securing position shown in FIG. 1; however, the said retainer plate 48 is effective, as shown in FIG. 3, for retaining the parts "in release position" when the said handle 33 has been rotated approximately 90 degrees from the position shown in FIG. 1, as best illustrated in FIG. 3. Here the retainer plate 48 will be in a substantially upright position for cooperatively retaining engagement with the head of the pivot pin 23, the said lips 51 on the free end of the retainer plate being adapted to cam against the head of pin 23 as the handle 33 arrives at its "release" position.

This provides a means by which the toggle clamp is retained in open or "release" position to prevent accidental closure thereof when not in use or to prevent injury to the parts or to an individual, and is thus an additional safety feature forming a part of the present toggle clamp.

In the "release" position shown the head of the pivot pin 23 nests within the arcuate recess 52 in the free flexible end of the retainer plate 48.

For a greater opening movement of arm 22 than shown in FIG. 3, stop 29 may be discarded, and alternate stops 44 added by welding these to each outer side of base plates 11 as shown in dotted line. It is seen that said arm may thus be rotated a greater distance into the "release" position, such as approximately 213 degrees and at the same time the handle will have an opening movement of approximately 112 degrees.

The locking angle of pin 43, FIG. 1, passing dead center with respect to the pivots 34 and 42 is now controlled by operating link 32, stopping on the new stops 44 in the closed position. The maximum-22-arm opening is controlled (213°) by arm 22 contacting operating link 32 thereby limiting the arm from further opening movement. This is of course assuming stop 29, FIG. 3, has been removed.

Having described my invention, reference should now be had to the following claims.

I claim:

1. A fast action guided arm toggle clamp, comprising a base adapted for securing upon a support, a pair of parallel spaced upright base plates fixedly secured to the base, an elongated bifurcated handle link with handle positioned over the exterior of said base plates and at a free end pivotally mounted thereon intermediate the front and rear edges of said base plates, a hold down arm guidably positioned between and engaging said plates along their upper edges and at its one end pivotally mounted adjacent one end of said base plates and extending transversely through said handle link, a work holddown means adjacent the other end of said holddown arm to retainingly engage a work upon said support, and a pair of upright parallel spacer links within said handle link arranged upon opposite sides of the holddown arm and at their respective one ends pivotally connected to said holddown arm, and at their respective other ends pivotally connected to said handle link, the pivotal connection between said spacer links and handle link on pivotal movement of said handle "to close" position lying past dead center of a line between the respective pivotal connections of said links with said holddown arm and said handle with said base plates locking said holddown arm in a work clamping position, a flexible retainer plate mounted upon said handle link and projecting therefrom, said retainer plate being formed so as to frictionally and retainingly engage the pivotal connection between said holddown arm and said base plates when in "released" position to prevent accidental dislodgment thereof.

2. A fast action guided arm toggle clamp, comprising a base adapted for securing upon a support, a pair of parallel spaced upright base plates fixedly secured to the base, an elongated bifurcated handle link with handle positioned over the exterior of said base plates and at a free end pivotally mounted thereon intermediate the front and rear edges of said base plates, a hold down arm guidably positioned between and engaging said plates along their upper edges and at its one end pivotally mounted adjacent one end of said base plates and extending transversely through said handle link, a work holddown means adjacent the other end of said holddown arm to retainingly engage a work upon said support, and a pair of upright parallel spacer links within said handle link arranged upon opposite sides of the holddown arm and at their respective one ends pivotally connected to said holddown arm, and at their respective other ends pivotally connected to said handle link, the pivotal connection between said spacer links and handle link on pivotal movement of said handle "to close" position lying past dead center of a line between the respective pivotal connections of said links with said holddown arm and said handle with said base plates locking said holddown arm in a work clamping position and a flexible retainer plate mounted upon said handle link and projecting therefrom, said retainer plate adjacent its free end having an offset recessed portion of substantially semi-circular shape terminating at its outer edge in a cam surface, said cam surface on movement of the parts to "release" position, being operatively engaged by the pivot pin interconnecting said holddown arm with said base plates for retainingly securing the holddown arm in "release" position against accidental dislodgment therefrom.

3. A fast action guided arm toggle clamp, comprising a base adapted for securing upon a support, a pair of parallel spaced upright base plates fixedly secured to the base, an elongated bifurcated handle link with handle positioned over the exterior of said base plates and at a free end pivotally mounted thereon intermediate the front and rear edges of said base plates, a hold down arm guidably positioned between and engaging said plates along their upper edges and at its one end pivotally mounted adjacent one end of said base plates and extending transversely through said handle link, a work holddown means adjacent the other end of said holddown arm to retainingly engage a work upon said support, and a pair of upright parallel spacer links within said handle link arranged upon opposite sides of the holddown arm and at their respective one ends pivotally connected to said holddown arm, and at their respective other ends pivotally connected to said handle link, the pivotal connection between said spacer links and handle link on pivotal movement of said handle "to close" position lying past dead center of a line between the respective pivotal connections of said links with said holddown arm and said handle with said base plates locking said holddown arm in a work clamping position, a flexible retainer plate fixedly secured at one end to an intermediate portion of said handle link and with its free end projecting therefrom, a laterally displaced recessed detent adjacent the free end of said retainer plate, and a cam surface at the outer edge of said retainer plate, the pivotal connection of said holddown arm with said base plates including a headed pin with the head thereof adapted to cam against said cam surface to interlockingly nest within the recessed portion of said retainer plate when the parts have been rotated to "release" position.

4. A fast action guided arm toggle clamp, comprising a base adapted for securing upon a support, a pair of parallel spaced upright base plates fixedly secured to the base, an elongated bifurcated handle link with handle positioned over the exterior of said base plates and at a free end pivotally mounted thereon intermediate the front and rear edges of said base plates, a hold down arm guidably positioned between and engaging said plates along their upper edges and at its one end pivotally mounted adjacent one end of said base plates and extending transversely through said handle link, a work holddown means adjacent the other end of said holddown arm to retainingly engage a work upon said support, and a pair of upright parallel spacer links within said handle link arranged upon opposite sides of the holddown arm and at their respective one ends pivotally connected to said holddown arm, and at their respective other ends pivotally connected to said handle link, the pivotal connection between said spacer links and handle link on pivotal movement of said handle "to close" position lying past dead center of a line between the respective pivotal connections of said links with said holddown arm and said handle with said base plates locking said holddown arm in a work clamping position, a stop plate secured upon said holddown arm intermediate its ends and projecting laterally from its opposite sides for cooperative retaining engagement with said spacer links when said clamp is in work securing position, and a flexible retainer plate mounted upon said handle link intermediate its ends and projecting therefrom, said retainer plate adjacent its free end having an offset recessed portion of substantially arcuate shape terminating at its outer edge in a cam surface, the pivotal connection of said holddown arm with said base plates including a headed pin with the head thereof adapted to cam against said cam surface and to interlockingly nest within said recessed portion of the retainer plate when the parts have been rotated to "release" position.

5. A fast action guided arm toggle clamp, comprising a base adapted for securing upon a support, a pair of parallel spaced upright base plates fixedly secured to the base, an elongated bifurcated handle link with handle positioned over the exterior of said base plates and at a free end pivotally mounted thereon intermediate the front and rear edges of said base plates, a holddown arm guidably positioned between and engaging said plates along their upper edges and at its one end pivotally mounted adjacent one end of said base plates and extending transversely through said handle link, a work holddown means adjacent the other end of said holddown arm to retainingly engage a work upon said support, and a pair of upright parallel spacer links within said handle link arranged upon opposite sides of the holddown arm and at their respective one ends pivotally connected to said holddown arm, and at their respective other ends pivotally connected to said handle link, the pivotal connection between said spacer links and handle link on pivotal movement of said handle "to close" position lying past dead center of a line between the respective pivotal connections of said links with said holddown arm and said handle with said base plates locking said holddown arm in a work clamping position, a stop secured upon one of said base plates above the pivotal mounting of said handle link for cooperative retaining engagement with said handle link when in work securing position, and a flexible retainer plate mounted upon said handle link intermediate its ends and projecting therefrom, said retainer plate adjacent its free end having an offset recessed portion of substantially arcuate shape terminating at its outer edge in a cam surface, the pivotal connection of said holddown arm with said base plates including a headed pin with the head thereof adapted to cam against said cam surface and to interlockingly nest within said recessed portion of the retainer plate when the parts have been rotated to a "release" position.

References Cited in the file of this patent
UNITED STATES PATENTS

| | | |
|---|---|---|
| 2,054,572 | McKenna | Sept. 15, 1936 |
| 2,236,439 | McKenna | Mar. 25, 1941 |
| 2,333,071 | Jannisse et al. | Oct. 26, 1943 |
| 2,427,603 | Higgins | Sept. 16, 1947 |
| 2,436,941 | Sendoykas | Mar. 2, 1948 |
| 2,456,100 | Wood | Dec. 14, 1948 |
| 2,537,594 | Lehmann | Jan. 9, 1951 |
| 2,763,802 | Dolan | Sept. 18, 1956 |
| 2,896,989 | Ehret | July 28, 1959 |
| 2,921,486 | Burke | Jan. 19, 1960 |
| 2,988,122 | Stevens et al. | June 13, 1961 |

FOREIGN PATENTS

| | | |
|---|---|---|
| 840,560 | Great Britain | July 6, 1960 |